July 15, 1924.

H. L. COOKE 1,501,161

MEANS FOR DISTORTING IMAGES OF PICTURES OR NATURAL OBJECTS

Filed Aug. 3, 1921

INVENTOR
H. LESTER COOKE
BY
Moses, Hammond, Morse & Nolte
ATTORNEYS

Patented July 15, 1924.

1,501,161

UNITED STATES PATENT OFFICE.

HEREWARD LESTER COOKE, OF PRINCETON, NEW JERSEY.

MEANS FOR DISTORTING IMAGES OF PICTURES OR NATURAL OBJECTS.

Application filed August 3, 1921. Serial No. 489,506.

*To all whom it may concern:*

Be it known that I, HEREWARD LESTER COOKE, a subject of the King of Great Britain, residing at Princeton, county of Mercer, and State of New Jersey, have invented certain new and useful Improvements in Means for Distorting Images of Pictures or Natural Objects, of which the following is a specification.

This invention relates to means for distorting images of pictures or natural objects, and has for its chief aim, the production of humorous effect in photographs and especially in motion pictures.

A good understanding of the invention may be had from the following description of several specific forms of embodiment thereof, reference being had to the accompanying drawing, in which.

Similar characters of reference designate similar parts in each of the several views.

Figure 2:
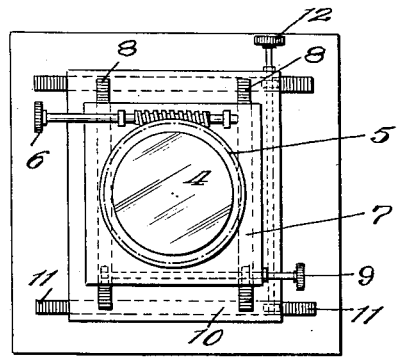
Figure 2 is a plan view of part of the apparatus, in the direction shown by the arrow 2 in Figure 1.

Reference character 1 designates a photographic camera. 3 is an object or picture, of which a distorted image is to be produced on the photographic plate in the camera 1. 4 is a reflector which may be a prism or a mirror of metal or of glass, preferably silvered on the external face, the reflector or mirror having an irregular or warped surface, whereby the objects viewed in said mirror appear distorted.

The mirror is mounted in a rotating ring 5, whose angular position is controlled by the milled head 6, operating a tangent screw as shown. The rotating ring 5 is supported on the sliding frame 7, which is capable of movement parallel to the racks 8, said movement being controlled by the milled head 9. The racks 8, on which the movable member 7 may be made to travel, are supported in turn by the movable platform 10, which travels on the racks 11, its position being controlled by the milled head 12. The member 20 which supports the mirror may be moved toward or away from the camera by means of the milled head 21 which is associated with a pinion which cooperates with a rack bar 22.

It is obvious that the three milled heads 6, 9 and 12, enable the mirror 4 to be brought into any position in its own plane, and the milled head 21 enables the mirror to be displaced in position relatively to its plane. The mirror 4 being irregular in surface, will produce a distorted virtual image 3' of the object or picture 3 in some position such as that shown. If now the lens of the camera 1 be stopped down to a small aperture, the arrangement shown will enable the distorted virtual image 3' of the object or picture 3 to be photographed in the camera 1. By changing the adjustments of the four milled heads 6, 9, 12 and 21, different kinds of distortions may be produced with the same apparatus.

Figure 1:
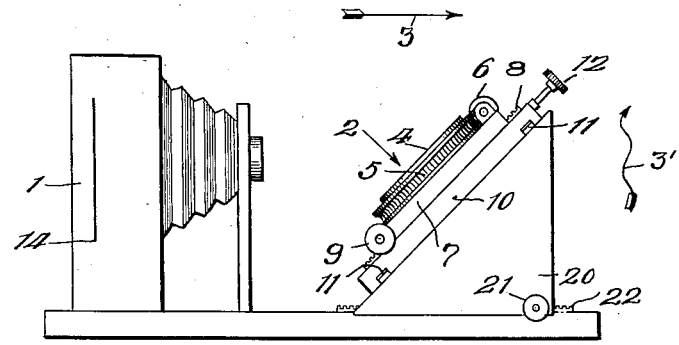
Figure 1 is an elevation of one form of the apparatus.

This invention may be applied to producing distorted positives of negatives placed in the position shown by 3, the whole apparatus shown in Figure 1 being enclosed and forming a kind of printing box.

Figure 3:
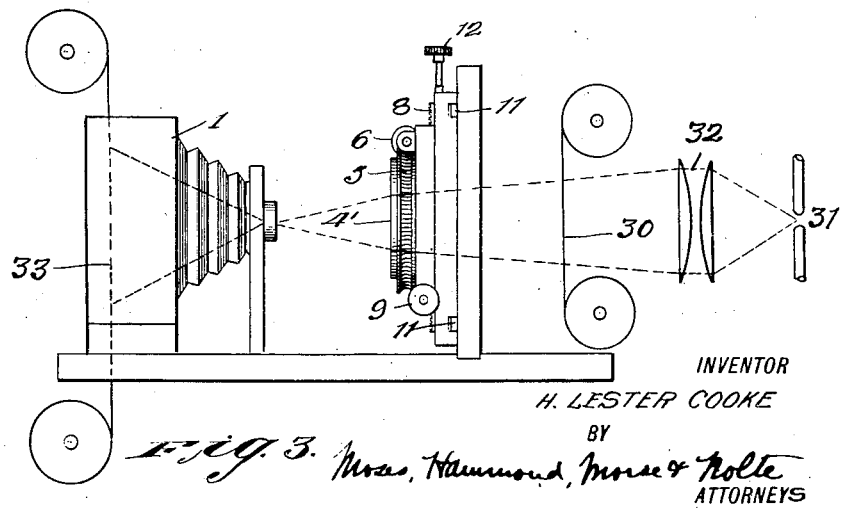
Figure 3 shows an alternative arrangement of the apparatus.

An alternative arrangement which produces the same type of distortion is obtained by replacing the irregular mirror 4 by the irregular sheet of transparent glass 4' shown in Figure 3, in which the mounting of the irregular transparent glass is the same as the mounting of the irregular mirror shown in Figure 1, except that it is preferably not placed at an angle. In the form of embodiment of the invention illustrated in Figure 3, the apparatus has been shown arranged so as to print a distorted motion picture film. The natural film is indicated at 30, this film being generally a negative, produced in the ordinary manner by the photography of objects in nature. This film is illuminated by a source of light, such as an arc-lamp 31 associated with a condensing lens 32. The light passes through film 30 and through the distorting glass 4', as indicated by the dotted lines, into camera 1, whereby it is focused on a sensitized film 33. The pictures in negative 30 are thus printed in the positive 33, these prints, however, being distorted owing to the irregularity of the glass 4'. Films 30 and 33 are advanced simultaneously, and the distorting effect of glass 4' is preferably changed between the successive images or groups of images, by manipulations of the knurled heads 6, 9 and 12. The distortion of the exposures of film 33 will thus be made to vary progressively, so that when the film is projected on a screen in the regular manner, the projected picture will appear to go through a course of distortion. A wide variety of humorous effects may thus be produced.

The apparatus of Figure 1 may be employed in similar manner for printing distorted films, and either form of apparatus may be employed, if desired, for producing distorted negatives directly from objects in nature. It will be understood, of course, that, whether employed for printing or direct photography, the apparatus is suitably enclosed to prevent interference from external light.

It may here be noted that the distorting effect may be brought about in various other ways which will readily suggest themselves. For example, the mirror 4 may be formed of flexible material such as thin sheet metal. The surface of this sheet may be warped in any convenient manner to produce the distortion, and the extent and nature of the warping may be changed, so as to vary the distortion in any desired manner. It will, therefore, be understood that, while I have illustrated and described my invention in connection with only a few preferred embodiments thereof, I do not limit myself to these specific embodiments shown, but that I intend to cover my invention broadly in whatever form its principle may be employed.

What I claim is:

1. In combination, an optical device arranged to form a distorted virtual image of an object, a photographic device in operative relation to said optical device for reproducing said virtual image, and means for changing the position of said optical device relatively to said object, to alter the distortion in the image, said means comprising mechanism whereby said optical device may be rotated about its axis and altered in position in its own plane, and means whereby the said plane may be changed in position.

2. In combination, an optical device arranged to form a distorted virtual image of an object, a photographic device in operative relation to said optical device for reproducing said virtual image, and means for changing the position of said optical device relatively to said object, to alter the distortion of the image, said means comprising mechanism whereby said optical device may be rotated about its axis and moved in two directions at right angles to one another in a plane substantially perpendicular to said axis and may be moved bodily toward or away from said photographic device.

In testimony whereof I have affixed my signature to this specification.

HEREWARD LESTER COOKE.